United States Patent Office 2,753,309
Patented July 3, 1956

2,753,309

DEFOAMING AGENTS

Hans G. Figdor, Philadelphia, Pa., assignor to Pioneer Chemical Works, Inc., Philadelphia, Pa., a corporation of Pennsylvania No Drawing. Application October 27, 1951,
Serial No. 253,563

13 Claims. (Cl. 252—358)

This invention relates to defoaming agents for aqueous systems having a tendency to foam, such as paper pulp and protein dispersions, latices of natural and synthetic rubber, sewage, and other materials. More specifically, it relates to defoaming agents which are emulsions of the oil-in-water type.

It is an object of the present invention to provide novel defoamers from inexpensive and readily available raw materials.

It is a further object of the present invention to provide novel defoamers which are very powerful in their action and which can be used highly diluted with water.

It is a further object of the present invention to provide defoamers suitable for use in neutral, alkaline and acid media.

It is a further object of the present invention to provide defoamers which are stable in storage and can be readily diluted with cold or luke warm water without requiring mechanical mixing equipment.

Other objects and advantageous features of the invention will be apparent from the specification and claims.

The defoamers of the present invention are oil-in-water emulsions containing, in addition to water, (1) a water insoluble hydrophobic organic material, (2) an emulsifier promoting the formation of oil-in-water type emulsions—it may be of cationic, anionic, or non-ionic nature, (3) a dihydric alcohol ester corresponding to the following formula

$R_1OCHR_3.CHR_4(OCHR_3CHR_4)_NOR_2$ in which $R_1$ is an acyl radical of a saturated aliphatic carboxylic acid containing from 6 to 10 carbon atoms (both inclusive), in a straight or branched chain; $R_2$ is hydrogen, or a lower alkyl group of not more than 4 carbon atoms, or an acyl radical of a saturated aliphatic carboxylic acid containing from 6 to 10 carbon atoms (both inclusive) in a straight or branched chain, $R_3$ is hydrogen or methyl, $R_4$ is hydrogen or methyl—at least one of $R_3$ and $R_4$ being hydrogen, N is zero or a postive integer. In other words, this formula stands for an esterification product of ethylene glycol, or a polyethylene glycol, or propylene glycol, or a polypropylene glycol with 1 or 2 molecules of an aliphatic carboxylic acid between hexanoic (caproic) and decanoic (capric) acid, or a branched chain isomer of one of these acids; in the case of a monoester, the other alcoholic hydroxyl group may be free, or etherified with a lower alcohol of 1 to 4 carbon atoms to form the alkoxy derivative; in the case of a diester, the two acid radicals may be identical or different from each other.

The first constituent of the composition of the present invention is an organic, water insoluble, hydrophobic material, which may be solid or liquid at room temperature. Suitable materials for this purpose include mineral oils; vegetable oils, such as peanut oil, cottonseed oil, teaseed oil, linseed oil, soya bean oil, olive oil, sesame oil, corn oil, rapeseed oil; animal oils, such as lard oil, neatsfoot oil, menhaden oil, sardine oil, codliver oil, or a mixture of these oils; non-saponifiable fatty or waxy materials, such as paraffin, scale wax, ceresin, and microcrystalline wax; saponifiable fatty and waxy materials, such as beeswax, hydrogenated fish oil, hydrogenated castor oil, hydrogenated marine glycerides, spermaceti, cacao butter, tallow and white grease. If a saponifiable material is used, a grade of low free acidity is preferred. Two, or more, materials from the foregoing may also, if desired be blended; e. g. paraffin with mineral oil, or paraffin with tallow.

The second constituent of the composition of the present invention is an emulsifier, which promotes the formation of oil-in-water type emulsions. Such an emulsifier may be anionic, cationic, or non-ionic. While there are a great number of emulsifiers available on the market, many of them are, at the same time, foaming agents and are, accordingly, less desirable for the purpose of this invention than emulsifiers which have no, or very little, foam promoting properties.

Examples of suitable anionic emulsifiers are: alkali metal, ammonium, and amine soaps; the fatty acid part of such soaps contains preferably at least 16 carbon atoms, because soaps based on lauric and myristic acid have a great tendency to develop abundant foam. The soaps may also be formed "in situ"; in other words, a fatty acid may be added to the oil phase and an alkaline material to the aqueous phase.

Other examples of suitable anionic emulsifiers are: alkali metal salts of alkyl-aryl sulfonic acids, sodium dialkyl sulfo-succinate, sulfated or sulfonated oils, e. g. sulfated castor oil; sulfonated tallow, alkali salts of short chain petroleum sulfonic acids.

Examples of suitable cationic emulsifiers are: salts of long chain primary, secondary, or tertiary amines, such as oleylamine acetate, cetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts, such as cetylpyridinium bromide, hexadecyl ethyl morpholinium chloride, and diethyl di-dodecyl ammonium chloride.

Examples of suitable non-ionic emulsifiers are: condensation products of higher fatty alcohols with ethylene oxide, such as the reaction product of oleyl alcohol with 10 ethylene oxide units; condensation products of alkyphenols with ethylene oxide, such as the reaction product of isooctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethylene glycol monobehenate tricosaethyleneglycol dibehenate; ethylene oxide condensation products of polyhydric alcohol partial higher fatty acid esters, and their inner anhydrides (mannitol-anhydride, called Mannitan, and sorbitolanhydride, called Sorbitan), such as glycerol monopalmitate reacted with 10 molecules of ethylene oxide, pentaerythritol monooleate reacted with 12 molecules of ethylene oxide, sorbitan monostearate reacted with 10 to 15 molecules of ethylene oxide, mannitan monopalmitate reacted with 10 to 15 molecules of ethylene oxide; long chain polyglycols in which one hydroxyl group is esterified with a higher fatty acid and the other hydroxyl group is etherified with a low molecular alcohol, such as methoxypolyethylene glycol 550 monostearate (550 meaning the average molecular weight of the polyglycol ether). A combination of two or more of these emulsifiers may be used; e. g. a cationic may be blended with a non-ionic; or an anionic with a non-ionic. Mixtures of cationic and anionic emulsifiers are incompatible and should be avoided. Emulsifiers which promote the formation of water-in-oil emulsions are not within the scope of this invention.

The third constituent of the present invention is a compound of the formula $$R_1O.CHR_3CHR_4(OCHR_3CHR_4)_n.OR_2$$

The meaning of $R_1$, $R_2$, $R_3$, $R_4$ and $n$ has been explained above. Examples of compounds represented by this formula are monoesters of a dihydric alcohol (glycol) and a saturated aliphatic carboxylic acid of 6 to 10 carbon atoms, such as ethylene glycol monocaprate, diethylene glycol monopelargonate, tetraethylene glycol mono 2-ethyl hexanoate, hexaethylene glycol mono-isoamyl-acetate, nonaethylene glycol monocaproate, polyethylene-glycol 4000 mono 2-ethyl-butyrate, propylene glycol monocaprylate, dipropylene glycol mono - dipropylacetate, polypropylene glycol 1200 monoheptanoate. Other examples are diesters of glycols and saturated carboxylic acids of 6 to 10 carbon atoms, such as ethylene glycol dipelargonate, triethylene glycol dicaprylate, hexaethylene glycol caproate caprate, nonaethylene glycol caprylate-2-ethyl-hexanoate, the mixed n-heptanoic-pelargonic ester of a polyethylene glycol of 1540 average molecular weight, propylene glycol di-2-ethyl-butyrate, the di-caproic ester of a polypropylene glycol of 400 average molecular weight, the mixed n-heptanoic-capric ester of a polypropylene glycol of 750 average molecular weight, the mixed mono- and di-pelargonic ester of a polypropylene glycol of 2025 average molecular weight. Other examples are esters of glycol lower mono-ethers with saturated aliphatic carboxylic acids of 6 to 10 carbon atoms, such as ethoxyethyl pelargonate, butoxyethyl caproate, ethoxy-ethoxyethyl caprate, butoxy-ethoxyethyl caprylate, methoxypolyethylene glycol 2-ethyl-hexanoate, the average molecular weight of said methoxypolyethylene glycol being 350.

The third or last named constituent is a very essential ingredient of the defoaming agents of the present invention, as will be shown in Examples 1 and 1a below. Compounds covered by this formula are not novel. A certain group among them, namely the diesters of polyethylene glycols containing 6 to 23 ethylene oxide units with saturated carboxylic acids of 6 to 10 carbon atoms have been described as wetting agents in my prior U. S. Patent No. 2,471,945. From the previous literature it could not be concluded, however, that these compounds would enhance the defoaming properties of oil-in-water emulsions.

For the purpose of this invention, the glycol derivatives just described which are the third constituent of the present defoaming agents, need not be chemically pure. As obvious to those skilled in the art, they are most readily prepared from a glycol, or a monoether of a glycol, and a carboxylic acid of 6 to 10 carbon atoms, by heating and splitting off water, in presence or absence of a catalyst and an entraining solvent. The dihydric alcohol or glycol is preferably esterified with any of the following acids: 6 carbons, hexanoic or caproic; 7 carbons, heptanoic or oenanthic; 8 carbons, octanoic or caprylic; 9 carbons, nonanoic or pelargonic; and 10 carbons, decanoic or capric, these being normal acids abbreviated "n-", e. g. n-heptanoic. In addition there are isomers with branched chains, e. g. 2-ethylbutyric and 2-ethylhexanoic where the figure "2" indicates the place within the molecule where the branching occurs and not that there are two ethyls. Instead of the free acid, a derivative, such as a halide or a lower ester, may be used. The crude reaction product, which may contain some free carboxylic acid and other impurities, may be used as such, and need not be purified to be useful for the purpose of this invention.

The defoamers of the present invention, as supplied for use, may or may not, contain water. If they do not, the products are, depending upon their melting points, either soluble oils or self-emulsifying waxes; in other words, they can be mixed into water to form oil-in-water emulsions. If they do contain water, the amount is preferably kept low for shipment, and the bulk of water is added at the place of application immediately before use. For most purposes, the concentrated defoamer can be diluted to a solids content of 0.1 to 2%, by weight.

The proportions in which the ingredients of the defoamers of the present invention are used should be kept within certain limits. Of the total solids, the hydrophobic, water insoluble, organic material should be between 50 and 80%, the emulsifier between 15 and 45%, the compound represented by the formula $$R_1O.CHR_3CHR_4(OCHR_3CHR_4)_n.OR_2$$

between 3 and 25%.

The defoaming agents of the present invention are compounded according to methods well known in the art of preparing emulsions and self emulsifying oils and waxes. If an anhydrous product is desired, the raw materials, if liquids, are merely mixed together, while, if solids, they are melted together at a temperature a few degrees above their melting points, and poured into molds. If an emulsion concentrate is desired, all the constituent materials except the water are mixed together, if necessary by melting, and water of substantially the same temperature as the mix is then gradually added with good agitation. Other methods, known in the art, may be applied; for example, if a cationic material such as cetylamine acetate is the emulsifier, the cetylamine may be combined with the oil phase, whereas the acetic acid is mixed with the water; or, if a soap such as morpholine stearate is the emulsifying agent, the stearic acid may be melted with the water insoluble hydrophobic organic material and the dihydric alcohol ester represented by the above formula, and this hot mixture stirred into a solution of morpholine in water. Or if the dihydric alcohol ester represented by the above formula is water dispersible, such as in the case of the monocaprate of polyethylene glycol, 1540 average molecular weight, it may be added together with the water to the melt of the other ingredients.

The viscosity of the emulsions may be increased, if desired, by adding thickening agents like methyl cellulose, sodium carboxymethyl cellulose, or polyvinyl alcohol. These thickeners may be previously dissolved in the water used in compounding, or they may be stirred into the final emulsion. In order to increase the storage stability, preservatives such as sodium salts of chlorinated phenols, or phenyl mercury compounds, may be added. The final emulsion may be passed through a colloid mill, if desired.

In order to apply the defoamers of the present invention to kill the foam in paper pulp dispersions, glue solutions, rubber latices, sewage, and other aqueous systems which have a tendency to foam, the defoamers are preferably diluted immediatedly before use. Such a dilution is made by stirring water gradually into the product. Cold or lukewarm water may be used, and the amount should be sufficient to obtain a dilute emulsion of about 0.1 to 2% solids content. This dilute emulsion is dripped into the system to be defoamed.

The invention will be more fully understood from the following specific examples, which are intended by way of illustration only, but not by way of limitation, and in which all parts are by weight unless otherwise noted.

*Example 1*

Melt together 40 parts of paraffin wax, 3.5 parts of Span 60 and 3.5 parts of Tween 60; add 53 parts of water at 60° C. with moderate agitation.

This is a conventional non-ionic emulsion, described on page 37 of the booklet "Surface Active Agents," issued 1948 by The Atlas Powder Co., Wilmington, Del. In this formula, Span 60 is sorbitan monostearate; Tween 60 is polyoxyethylene sorbitan monostearate.

This emulsion has practically no defoaming properties.

Example 1a

The same emulsion as described in Example 1 is made except that 5 parts of the water are replaced by 5 parts of diethylene glycol dipelargonate. Unlike the product of Example 1, this emulsion has very good foam killing properties.

Example 2

66 parts of mineral oil, 24 parts of nonaethylene glycol dioleate and 10 parts of hexaethylene glycol dicaprylate are mixed together, to form a soluble oil. One part of this oil, diluted with 99 parts of water, forms a defoaming agent for paper pulp, and other foaming systems.

Example 3

65 parts of beef tallow, are melted together with 25 parts of tetraethylene glycol monostearate, and 10 parts of the compound

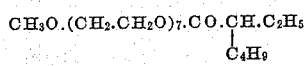

and allowed to cool. There forms a soft wax, which is readily dispersible in water to form a good defoaming agent.

The compound of the formula given above is prepared by reacting one molecule of a methoxypolyethylene glycol, containing seven ethylene oxide units, with one molecule of 2-ethyl-hexanoic acid, and a catalytic amount of p-toluenesulfonic acid for 3 hours at 180 to 220° C., splitting off one molecule of water.

Example 4

24 parts of partly hydrogenated tallow, 7 parts of the stearic acid ester of a methoxypolyethylene glycol, containing an average of 7 ethylene oxide units, and 5 parts of the mono n-heptanoic acid ester of a polyethylene glycol of 1000 average molecular weight, are melted together; then 64 parts of warm water are stirred in; agitation is continued until the product has cooled down to room temperature, to form a pasty emulsion. A small amount of a preservative, e. g. 0.1% of phenyl mercuric acetate, is added. This emulsion can be readily diluted with water and used as a defoamer.

Example 5

70 parts of mineral oil are mixed with 18 parts of dimethyl di-dodecyl-ammonium chloride and 12 parts of triethylene glycol di-2-ethyl-butyrate, to form a soluble oil of cation-active properties. It can be readily diluted with water to form a good defoaming agent.

Example 6

28 parts of tallow are melted together with 7 parts of cetylamine acetate and 5 parts of the mixed mono- and di-ester of 2-ethyl-hexanoic acid and a polyethylene glycol of 1540 average molecular weight; then 60 parts of warm water are added with agitation. This emulsion provides a good defoaming agent and can be readily diluted with water.

Example 7

24 parts of hydrogenated fish oil, 3 parts of tridecaethylene glycol monostearate, 4 parts of aminoethyl-aminoethyl stearamide (a reaction product of equimolecular parts of stearic acid and diethylene-triamine with elimination of 1 molecule of water) and 4 parts of the esterification product of a polyethylene glycol of 4000 average molecular weight with 1 molecule capric and 1 molecule caproic acid are heated to 85° C. Then a mixture of 1.5 parts of glacial acetic acid and 63.5 parts of water of 85° C. are slowly stirred in. This emulsion provides a good defoaming agent and can be readily diluted with water.

Example 8

24 parts of tallow, 6 parts of stearic acid, and 5 parts of the mono-ester of a polyethylene glycol 1000 average molecular weight with n-heptanoic acid are melted and poured into a hot solution of 3 parts of triethanolamine in 62 parts of water. The mixture is agitated while cooling, provides a good defoaming agent, and can be readily diluted with water.

Example 9

24 parts of tallow, 3 parts of palmitic acid and 3.5 parts of nonaethylene glycol mono-palmitate are melted and stirred into a hot mixture of 1.5 parts of diethanolamine, 5 parts of polyethylene glycol (average molecular weight: 1000) monocaprate and 63 parts of water, to form an emulsion with good defoaming properties.

Example 10

30 parts of mineral oil, 30 parts of peanut oil, 25 parts of nonaethylene-glycol dioleate and 15 parts of dipropylene glycol di-2-ethylbutyrate are mixed together to form a self-emulsifiable oil having good defoaming properties.

Example 11

22 parts of spermaceti wax, 4 parts of mineral oil, 8 parts of nonaethylene glycol mono-oleate and 6 parts of the monopelargonic ester of a polypropylene glycol of 400 average molecular weight are melted together; upon this, 60 parts of hot water are added with stirring to form an oil-in-water emulsion of good defoaming properties.

Example 12

30 parts of neatsfoot oil, 4 parts of tetraethylene glycol monolaurate, 4 parts of sulfonated castor oil (60%), 6 parts of propylene glycol dicaprylate and 56 parts of water are stirred together to form an oil-in-water emulsion having good defoaming properties.

Example 13

18 parts of paraffin wax, 6 parts of mineral oil, 7 parts of the di-steric acid ester of nonaethylene glycol, 1 part of sodium petroleum sulfonate and 4 parts of the esterification product of a polypropylene glycol of 750 average molecular weight with one molecule 2-ethylbutyric acid and one molecule pelargonic acid, are melted together; upon this, 64 parts of hot water are added with good agitation, to form an oil-in-water emulsion having good defoaming properties.

I claim:

1. A defoaming agent for aqueous systems which have a tendency to foam, consisting essentially of, in addition to water, and in proportions by weight on an anhydrous basis, 50 to 80% of a hydrophobic water insoluble organic material selected from the group consisting of fats, waxes, and oils; 15 to 45% of an emulsifier which promotes the formation of oil-in-water emulsions; and 3 to 25% of a dihydric alcohol ester corresponding to the formula

in which $R_1$ is an acyl radical of a saturated aliphatic carboxylic acid containing from 6 to 10 carbon atoms; $R_2$ is a member of the group consisting of hydrogen, a low alkyl group, and an acyl radical of a saturated aliphatic carboxylic acid containing from 6 to 10 carbon atoms; $R_3$ and $R_4$ are chosen from the group consisting of hydrogen and methyl, at least one being hydrogen, and $n$ is an integer from zero to 90.

2. A defoaming agent as defined in claim 1, in which the emulsifier is non-ionic.

3. As a defoaming agent to be applied in dilution with water, an anhydrous water dispersible composition, consisting essentially of in parts by weight 50 to 80% of a hydrophobic water insoluble organic material selected from the group consisting of fats, waxes, and oils; 15 to 45% of an emulsifier which promotes the formation of oil-in-water emulsions; and 3 to 25% of a dihydric alcohol ester corresponding to the formula $$R_1O.CHR_3.CHR_4(OCHR_3CHR_4)_n.OR_2$$

in which $R_1$ is an acyl radical of a saturated aliphatic carboxylic acid containing from 6 to 10 carbon atoms; $R_2$ is a member of the group consisting of hydrogen, a low alkyl group, and an acyl radical of a saturated aliphatic carboxylic acid containing from 6 to 10 carbon atoms; $R_3$ and $R_4$ are chosen from the group of hydrogen and methyl, at least one being hydrogen; and $n$ is an integer between zero and 90.

4. As a defoaming agent for aqueous systems which have a tendency to foam, a self-emulsifying oil to be applied in dilution with water, consisting essentially of in parts by weight 50 to 80% of an oil, 15 to 45% of an emulsifier containing in its molecule at least 12 carbon atoms and promoting the formation of oil-in-water emulsions, and 3 to 25% of a dihydric alcohol ester corresponding to the formula $$R_1O.CHR_3.CHR_4(OCHR_3.CHR_4)_m.OR_2$$

in which $R_1$ is an acyl radical of a saturated aliphatic carboxylic acid containing from 6 to 10 carbon atoms; $R_2$ is a member of the group consisting of hydrogen, an alkyl group containing not more than 4 carbon atoms, and an acyl radical of a saturated aliphatic carboxylic acid containing from 6 to 10 carbon atoms; $R_3$ and $R_4$ are chosen from the group of hydrogen and methyl, at least one being hydrogen; and $m$ is an integer between zero and 12.

5. As a defoaming agent for aqueous systems which have a tendency to foam, an oil-in-water emulsion, consisting essentially of, in addition to water, by weight 50 to 80% of a wax, 15 to 45% of an emulsifier containing at least 16 carbon atoms and promoting the formation of oil-in-water emulsions, and 3 to 25% of a dihydric alcohol ester corresponding to the formula $$R_1O.C_2H_4(OC_2H_4)_n.OR_2$$

in which $R_1$ is an acyl radical of a saturated aliphatic carboxylic acid containing from 6 to 10 carbon atoms; $R_2$ is a member of the group consisting of hydrogen, a lower alkyl group containing not more than 4 carbon atoms, and an acyl radical of a saturated aliphatic carboxylic acid containing from 6 to 10 carbon atoms, and $n$ is an integer from zero to 90.

6. As a defoaming agent for aqueous systems which have a tendency to foam, an oil-in-water emulsion, consisting essentially of, in addition to water, by weight 50 to 80% of a wax, 15 to 45% of an emulsifier containing at least 16 carbon atoms and promoting the formation of oil-in-water emulsions, and 3 to 25% of dihydric alcohol ester corresponding to the formula $$R_1O.C_3H_6(OC_3H_6)_p.OR_2$$

in which $R_1$ is an acyl radical of a saturated aliphatic carboxylic acid containing from 6 to 10 carbon atoms; $R_2$ is a member of the group consisting of hydrogen, a lower alkyl group containing not more than 4 carbon atoms, and an acyl radical of a saturated aliphatic carboxylic acid containing from 6 to 10 carbon atoms, and $p$ is an integer from zero to 34.

7. As a defoaming agent for aqueous systems which have a tendency to foam, an oil-in-water emulsion, consisting essentially of, in addition to water, by weight 50 to 80% of a hydrophobic water insoluble organic material selected from the group consisting of fats, waxes, and oils; 15 to 45% of an emulsifier which promotes the formation of oil-in-water emulsions; and 3 to 25% of a monoester of a dihydric alcohol corresponding to the formula $$R_1O.CHR_3.CHR_4(OCHR_3.OCHR_4)_n.OH$$

in which $R_1$ is an acyl radical of a saturated aliphatic carboxylic acid containing from 6 to 10 carbon atoms; $R_3$ and $R_4$ are chosen from the group of hydrogen and methyl, at least one of them being hydrogen, and $n$ is an integer from zero to 90.

8. As a defoaming agent for aqueous systems which have a tendency to foam, an oil-in-water emulsion, consisting essentially of, in addition to water, by weight 50 to 80% of a hydrophobic water insoluble organic material selected from the group consisting of fats, waxes, and oils; 15 to 45% of an emulsifier which promotes the formation of oil-in-water emulsions, and 3 to 25% of a diester of a dihydric alcohol corresponding to the formula $$R_1O.CHR_3CHR_4.(OCHR_3CHR_4)_n.OR_1$$

in which $R_1$ is an acyl radical of a saturated aliphatic carboxylic acid containing from 6 to 10 carbon atoms; $R_3$ and $R_4$ are chosen from the group consisting of hydrogen and methyl, at least one being hydrogen; and $n$ is an integer between zero and 90.

9. A defoaming agent as defined in claim 8, in which $R_1$ is n-octanoyl.

10. A defoaming agent as defined in claim 8, in which $R_1$ is 2-ethyl-hexanoyl.

11. A defoaming agent as defined in claim 8, in which $R_1$ is n-nonanoyl.

12. As a defoaming agent for aqueous systems which have a tendency to foam, an oil-in-water emulsion, consisting essentially of, in addition to water, by weight 50 to 80% of a hydrophobic water insoluble organic material selected from the group consisting of fats, waxes, and oils; 15 to 45% of an emulsifier which promotes the formation of oil-in-water emulsions; and 3 to 25% of a dihydric alcohol ether-ester, corresponding to the formula $$R_1OC_2H_4.(OC_2H_4)_n.OAlk$$

in which $R_1$ is an acyl radical of a saturated aliphatic carboxylic acid containing from 6 to 10 carbon atoms, $n$ is an integer from zero to 80; and Alk is an alkyl group containing from 1 to 4 carbon atoms.

13. A defoaming agent for aqueous systems which have a tendency to foam consisting essentially of by weight 50 to 80% of a hydrophobic water insoluble wax, 15 to 45% of a non-ionic emulsifier which promotes the formation of oil-in-water emulsions, and 3 to 25% of a dihydric alcohol ester corresponding to the formula $$R_1O.CHR_3CHR_4.(OCHR_3CHR_4)_n.OR_1$$

in which $R_1$ is 2-ethyl-hexanoyl, $R_3$ and $R_4$ are chosen from the group consisting of hydrogen and methyl, at least one being hydrogen, and $n$ is an integer between zero and 80.

References Cited in the file of this patent

UNITED STATES PATENTS

| | | |
|---|---|---|
| 2,471,945 | Figdor | May 31, 1949 |
| 2,563,857 | McGinn | Aug. 14, 1951 |